July 23, 1940. S. BRAND 2,209,106
RECORD CONTROLLED MACHINE
Filed Jan. 31, 1939 9 Sheets-Sheet 1

INVENTOR
Samuel Brand
BY
ATTORNEY

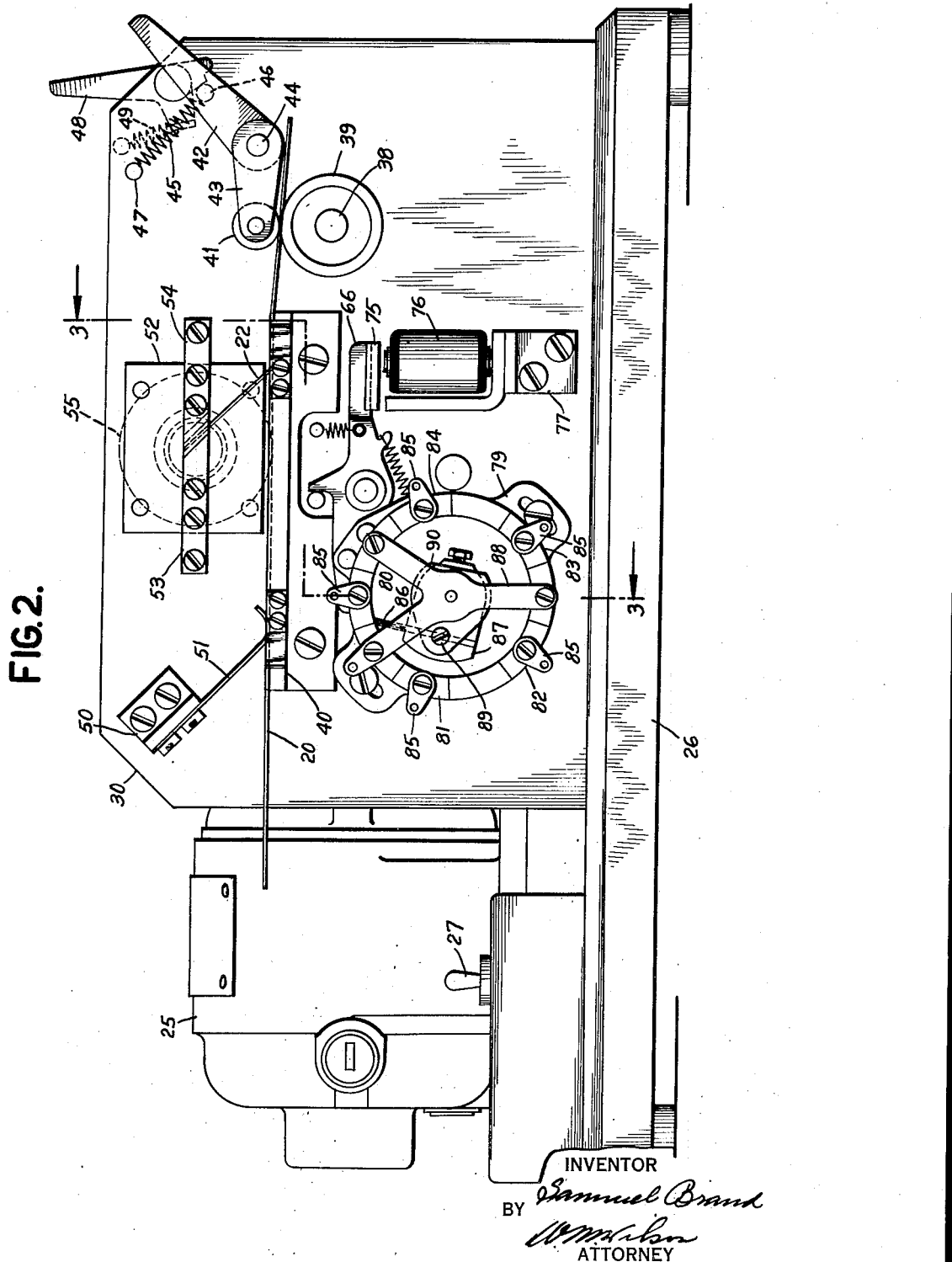

July 23, 1940.  S. BRAND  2,209,106
RECORD CONTROLLED MACHINE
Filed Jan. 31, 1939  9 Sheets-Sheet 3
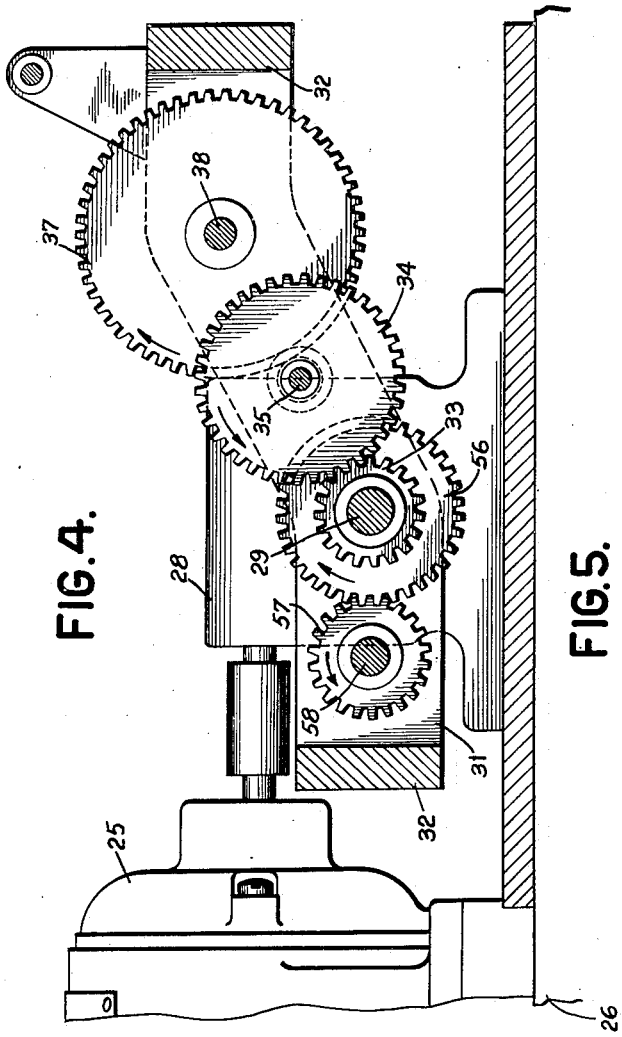
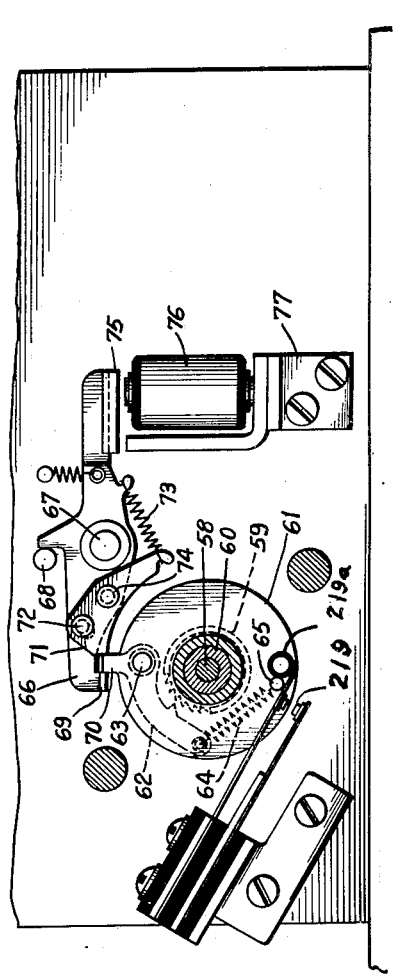
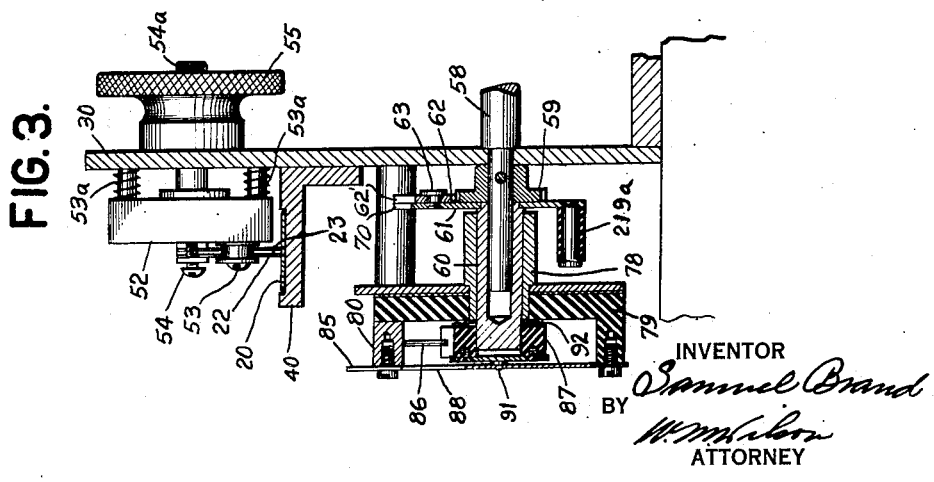
INVENTOR
Samuel Brand
BY
W. M. Wilson
ATTORNEY July 23, 1940.　　　　　S. BRAND　　　　　2,209,106
RECORD CONTROLLED MACHINE
Filed Jan. 31, 1939　　　　9 Sheets-Sheet 4
FIG. 6.　　FIG. 7.　　FIG. 8.　　FIG. 10.
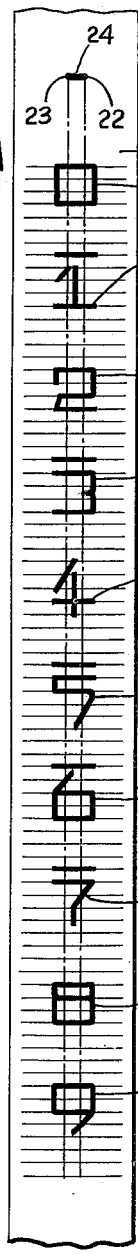
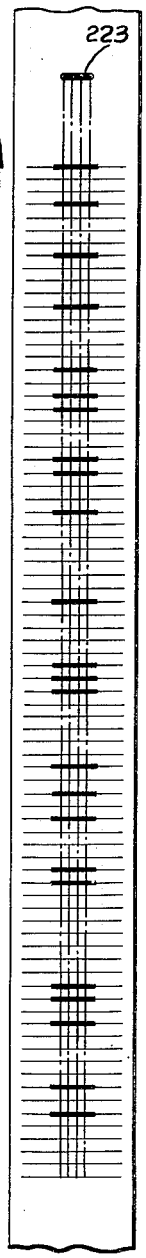
| CHARACTER | SEGMENTS |
|---|---|
| 0 | 80,83 |
| 1 | 80,84 |
| 2 | 80,82,83 |
| 3 | 80,81,84 |
| 4 | 80 |
| 5 | 80,81,82 |
| 6 | 80,82,84 |
| 7 | 80,81 |
| 8 | 80,81,83 |
| 9 | 80,82 |
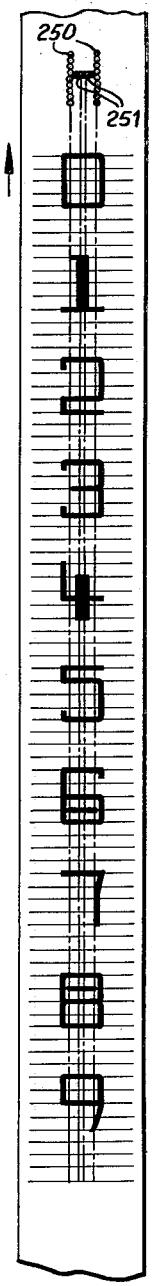
FIG. 9.
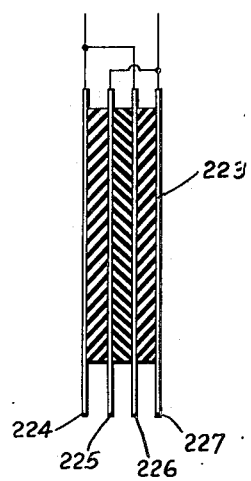
INVENTOR
Samuel Brand
BY
W. M. Wilson
ATTORNEY

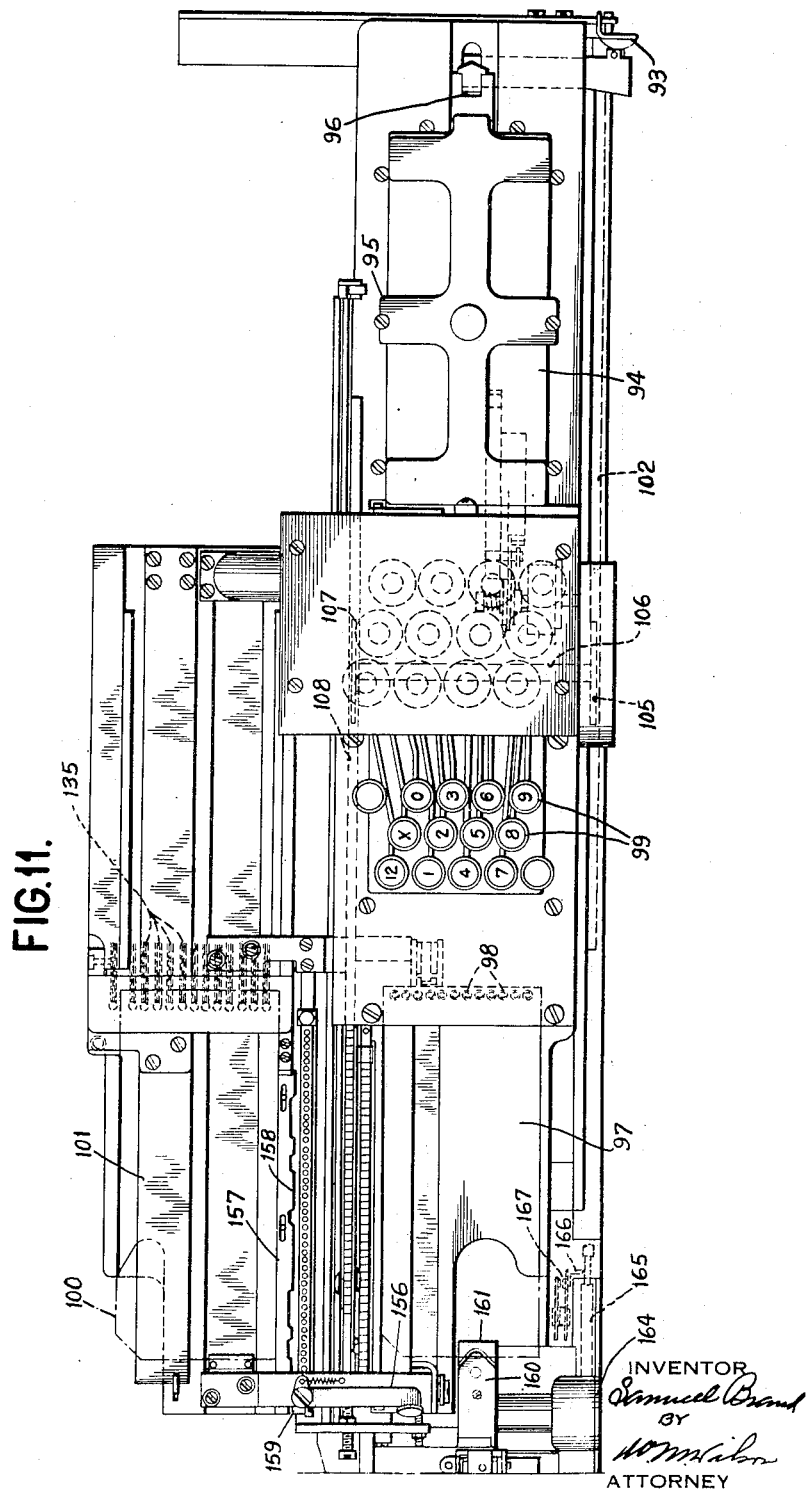

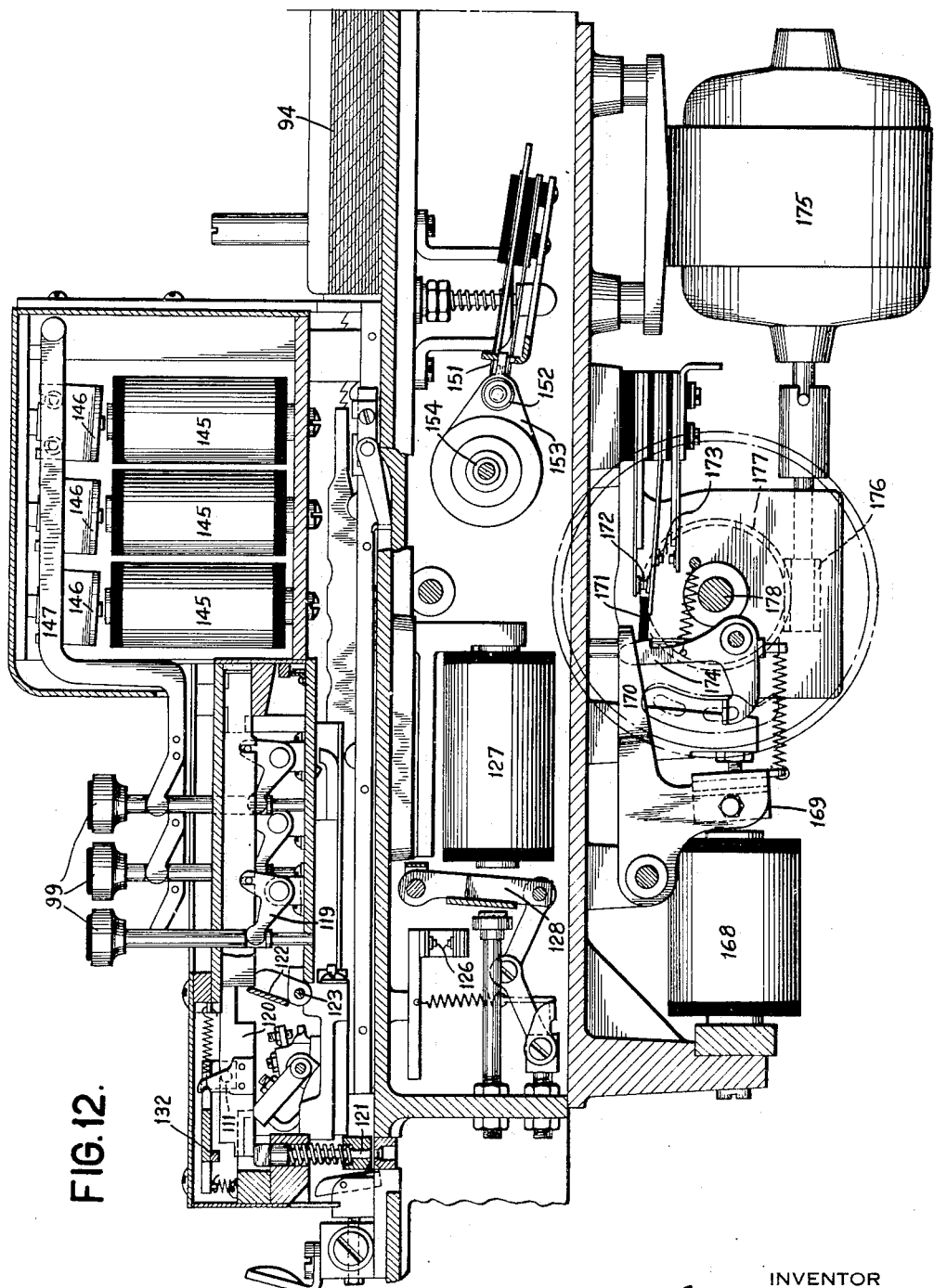

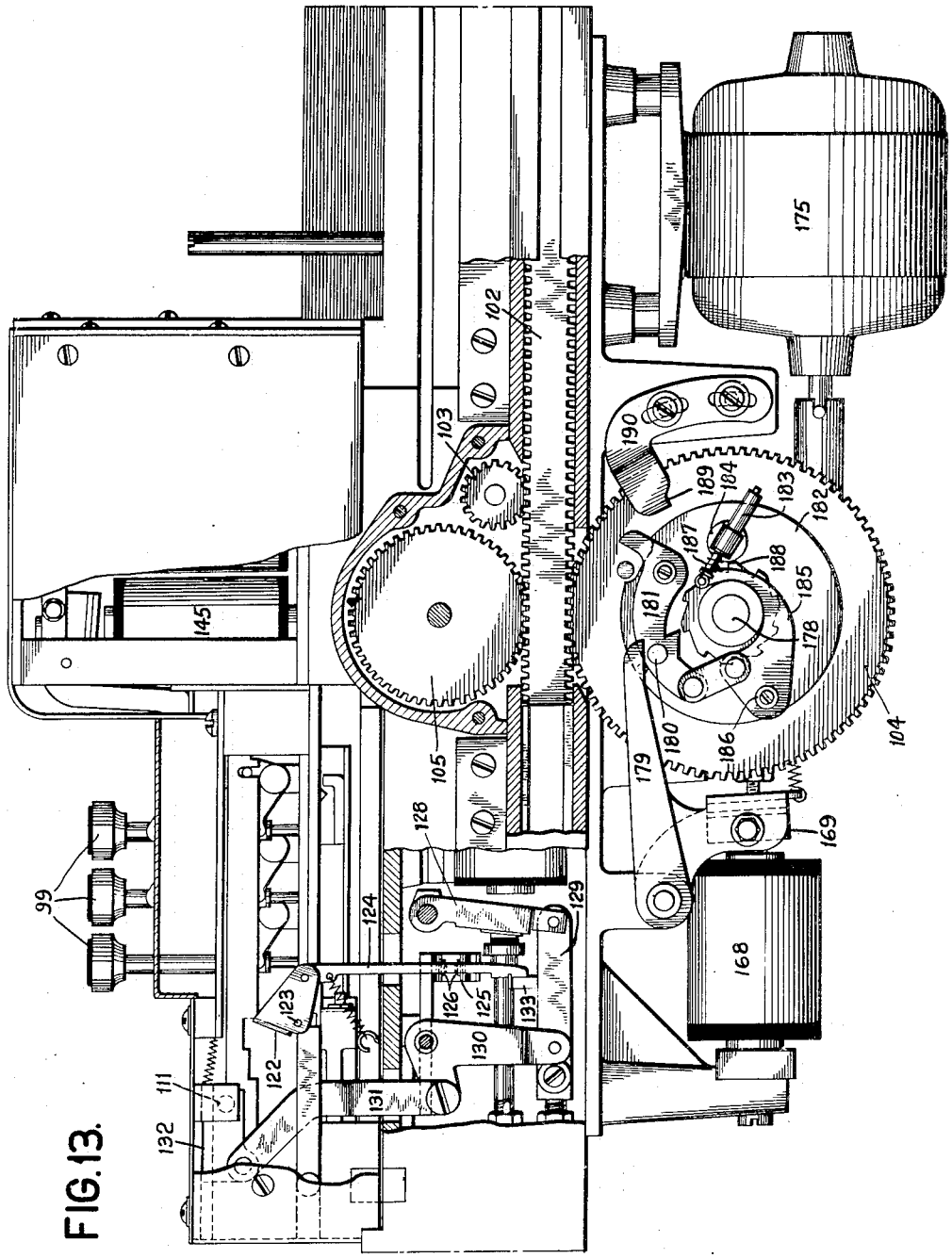

July 23, 1940.　　　　S. BRAND　　　　2,209,106
RECORD CONTROLLED MACHINE
Filed Jan. 31, 1939　　　9 Sheets-Sheet 8
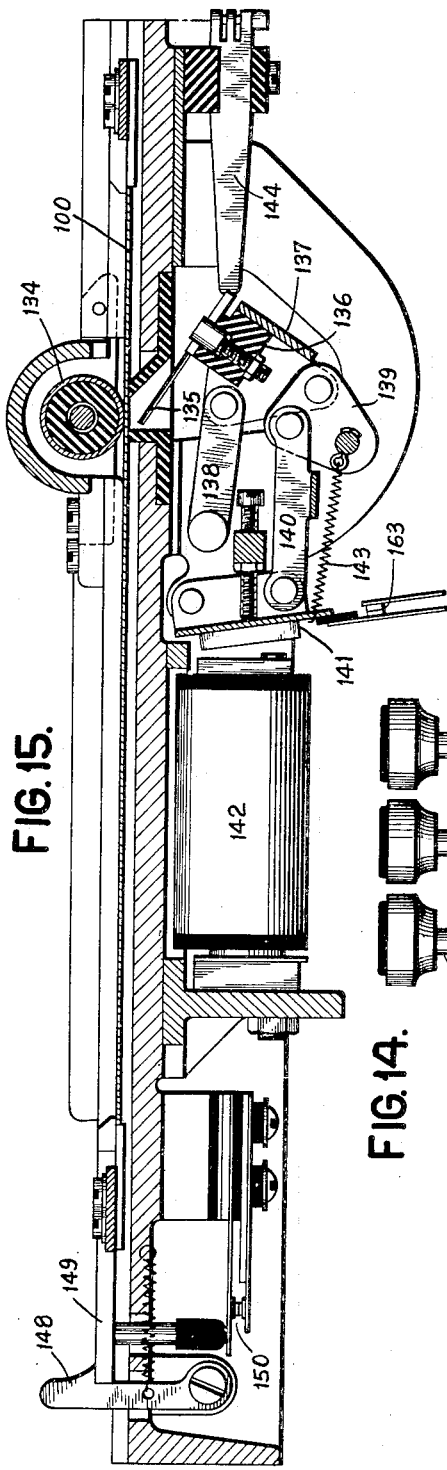
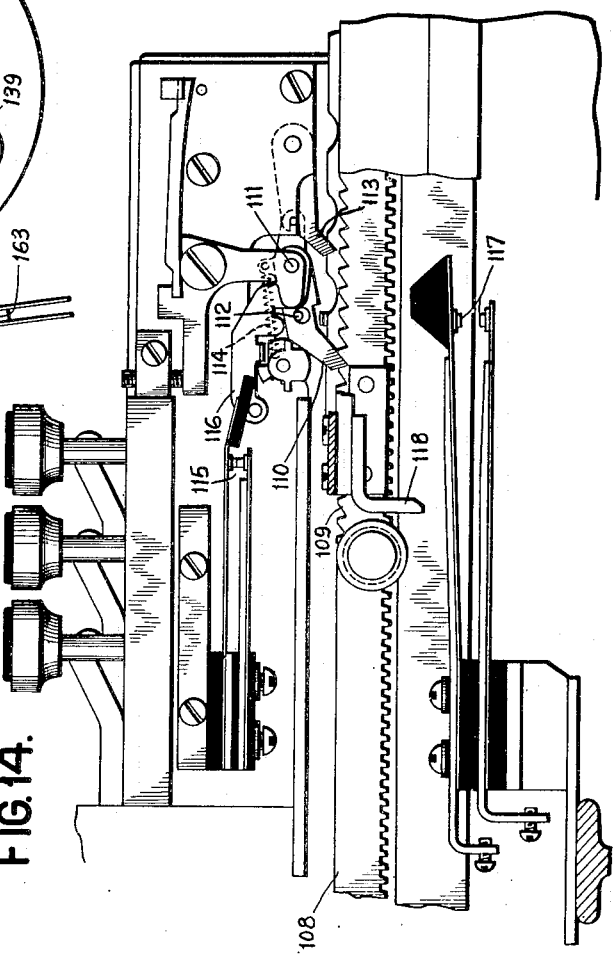
INVENTOR
Samuel Brand
BY
ATTORNEY July 23, 1940. S. BRAND 2,209,106

RECORD CONTROLLED MACHINE

Filed Jan. 31, 1939 9 Sheets-Sheet 9

INVENTOR
Samuel Brand
BY
ATTORNEY

Patented July 23, 1940

2,209,106

UNITED STATES PATENT OFFICE 2,209,106

RECORD CONTROLLED MACHINE

Samuel Brand, Binghamton, N. Y., assignor to International Business Machines Corporation, New York, N. Y., a corporation of New York Application January 31, 1939, Serial No. 253,819

30 Claims. (Cl. 164—115)

This invention relates to devices for reading characters carried by a record sheet and more particularly to means for reading graphical characters and effecting operation of a machine in accordance with the values of the characters.

In the past various means have been provided for reading characters carried by a record sheet and converting them into current indications for controlling purposes. Many of these have used a source of light and a comparing member for affecting photo-electric cells selectively in accordance with the value of the character. Others have a series of photo-electric cells positioned to be covered in various combinations by the characters. It is well-known that the characters printed by the usual typewriting or printing devices used in forming record sheets, are not always perfectly regular and that the positions of the characters are not always in perfect horizontal and vertical alignment. It has been extremely difficult to provide for correct operation of the former reading devices when the characters are thus irregularly disposed on the record sheet.

In contrast the present device permits a large variation in the disposal of the characters on the record sheet while maintaining accuracy in reading. In order to accomplish this result, the record sheet is so fed that each character is scanned progressively, each of the characters being formed to influence the scanning means at certain times during the scanning thereof in conformity with a code, and means are provided to selectively set up code storage devices according to the times at which the scanning means is influenced, which storage devices may be used to effect selective energization of certain additional work circuits.

In the preferred embodiment of the present invention, the characters are of an electricity conductive substance, such as conductive ink, and are scanned by spaced sensing brushes. Each character is arranged to be scanned progressively from end to end and has one or more index points positioned along the line of scanning for interconnecting the brushes in conformity with a code set up to differentiate between different characters. The characters may be legible variations of conventional shapes but so formed that only those portions at substantially right angles to the line of scanning will interconnect the sensing brushes, which portions may be called index marks. Further, the index marks may extend on each side of the line of scanning, whereby a variation in the horizontal disposition of a character on the sheet will still allow the index marks to interconnect the brushes. Since the characters are to be scanned successively, any irregularity in the vertical disposition thereof will not prevent accurate reading.

The present invention also contemplates scanning of a single column record sheet in the manner just described and selectively energizing a plurality of work circuits associated with a character entry means such as a card punching mechanism to perforate a record card in accordance with the value of the characters read. Interconnection of the sensing brushes by an index mark will change the grid bias on an amplifying vacuum tube permitting it to pass current to a distributor for selectively energizing a plurality of work circuits. The distributor is operated in timed relation to the means for moving the record sheet past the sensing brushes and therefore will energize the various work circuits in accordance with the spacing of the index marks of each character. The energization of the work circuits effects selective operation of the punching mechanism. In addition, the distributor is halted between the sensing of each character and operation thereof is initiated by the influence of the first index mark of each character. Consequently, an error in the reading of one character will not affect the reading of the next one.

It is therefore an object of the present invention to provide a device for reading characters carried by a record sheet in which means are provided to scan each character progressively with the characters having one or more index marks positioned in accordance with a predetermined code for successively influencing the scanning means, and additional means are arranged to act in response to the scanning means to selectively energize a plurality of work circuits.

Another object of the present invention is to provide a reading device having a distributor acting in timed relation to the sheet feeding means for selectively energizing work circuits in accordance with the time of influencing of the scanning means by the character index marks.

It is still another object to provide a reading device having scanning means including spaced sensing brushes for interconnection by electricity conductive characters, with the points of interconnection being positioned in accordance with a predetermined code.

It is a further object of the present invention to provide work agencies controlled in accordance with the values of characters, such as, for example, a mechanism for perforating a card according to the values of characters carried by a record sheet, which includes means for scanning the sheet and means responsive to the scanning means for effecting selective punching.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 2 is a front elevation of the reading device.

Fig. 3 is a view along line 3—3 of Fig. 2.

Fig. 4 is a view along line 4—4 of Fig. 1.

Fig. 5 is a detail view showing the one revolution clutch used with the distributor.

Fig. 6 is a view of the record sheet.

Fig. 7 discloses an alternate record sheet.

Fig. 8 is a chart for use in connection with Figs. 6 and 7.

Fig. 9 is an enlarged view of the sensing brushes for use with a sheet of the type shown in Fig. 7.

Fig. 10 illustrates another type of record sheet.

Fig. 11 is a plan view of the punching mechanism for which the reading device is especially adapted.

Fig. 12 is a sectional view illustrating details of construction of the punching mechanism.

Fig. 13 is a view similar to Fig. 12 but taken on a line further to the front of the mechanism.

Fig. 14 is a view illustrating the details of the carriage escapement mechanism and a contact controlling device.

Fig. 15 is a sectional view showing the duplicating brush shifting and controlling devices.

Figure 16:
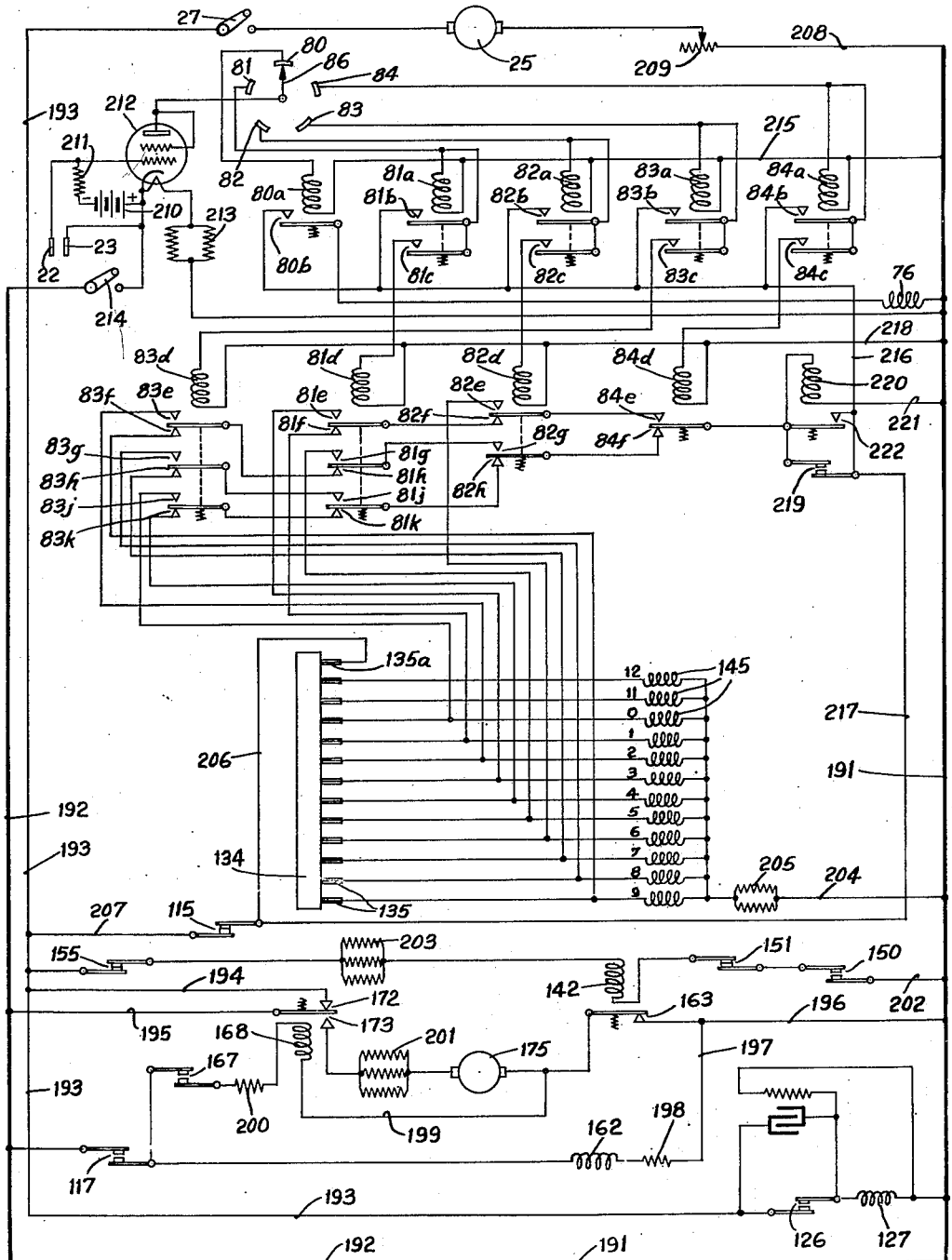

Fig. 16 is a wiring diagram.

In Fig. 6 is shown a record sheet 20 having characters 21 thereon of electricity conductive substance or material and representing the digits 0 through 9. These characters are variations of a conventional shape and may be formed with a typewriter having type of the desired shape and using conductive ink. It will be understood, of course, that other means may be used to form the characters and other substances may be used to render the characters conductive. The characters are disposed in a vertical column on the sheet which is to be fed past a pair of sensing brushes 22 and 23 in the direction indicated by the arrows. The brushes 22 and 23, located with respect to the sheet as shown diagrammatically in Fig. 6, are spaced from each other by insulation 24 and will be electrically interconnected when they simultaneously engage connected portions of a character. Thus, the characters will be presented to the sensing brushes successively and each character will be scanned progressively from top to bottom along a straight line.

The reading device is shown in Figs. 1 to 5. An electric motor 25 is mounted on a base 26 and is controlled by a manual switch 27. The motor is arranged through gear box 28 to drive shaft 29 which is journaled in plate 30 and auxiliary plate 31. Plate 30 is rigidly mounted on base 26 and extends vertically therefrom. While auxiliary plate 31 is also vertical, it is secured to plate 30 and spaced from it by spacers 32. In between these two plates a gear 33 is secured to shaft 29 to be driven in a clockwise direction thereby. Intermediate gear 34, mounted on shaft 35, which is journaled in plates 30 and 31, is engaged by gear 33 to be driven counterclockwise and in turn to effect rotation of gear 36 which is also mounted on shaft 35. Gear 36 engages gear 37 mounted on shaft 38 to effect clockwise rotation thereof. The shaft 38 is also journaled in plates 30 and 31 but extends in front of plate 30 where it carries a feed roll 39.

The record sheet 20 is to be fed into the device from the left side and over a guide table 40 mounted on plate 30. From the table 40, the sheet passes over feed roll 39 and out the right side of the device. A pressure roll 41 is arranged to engage the sheet to hold it firmly against the feed roll to be driven thereby. Pressure roll 41 is rotatably mounted between lever 42 and lever 43. Both of these levers are pivoted on stud 44 carried by plate 30 and are additionally separated by spacer 44a. Lever 42 is biased counterclockwise by spring 45 extending between pins 46 on lever 42 and pin 47 on the plate 30. An additional lever 48 is pivoted on plate 30 and biased clockwise by spring 49. This latter lever 48 is notched on its lower end which is so positioned that upon manual pressure on lever 42 to raise the pressure roll, the lever 48 will be rotated slightly by spring 49 to cause the notch to engage pin 46 and lock lever 42 with the roll raised to permit insertion of a new sheet. Lever 42 may be released by manual pressure on lever 48.

Mounted on plate 30 at the opposite end of table 40 is a bracket 50 which carries a leaf spring 51 arranged to engage the sheet 20 to hold it firmly against the table and to cooperate with the feed roll in holding the sheet taut as it passes over the table. The table 40 (Fig. 3) is shaped to guide the sheet as it passes beneath the sensing brushes 22 and 23, which are carried by an insulating block 52 with one brush connected to terminal 53 and one to terminal 54. The block 52 is resiliently mounted on guide members 53a and is arranged for adjustment crosswise of the sheet by micrometer screw 54a and hand nut 55.

Figure 1:
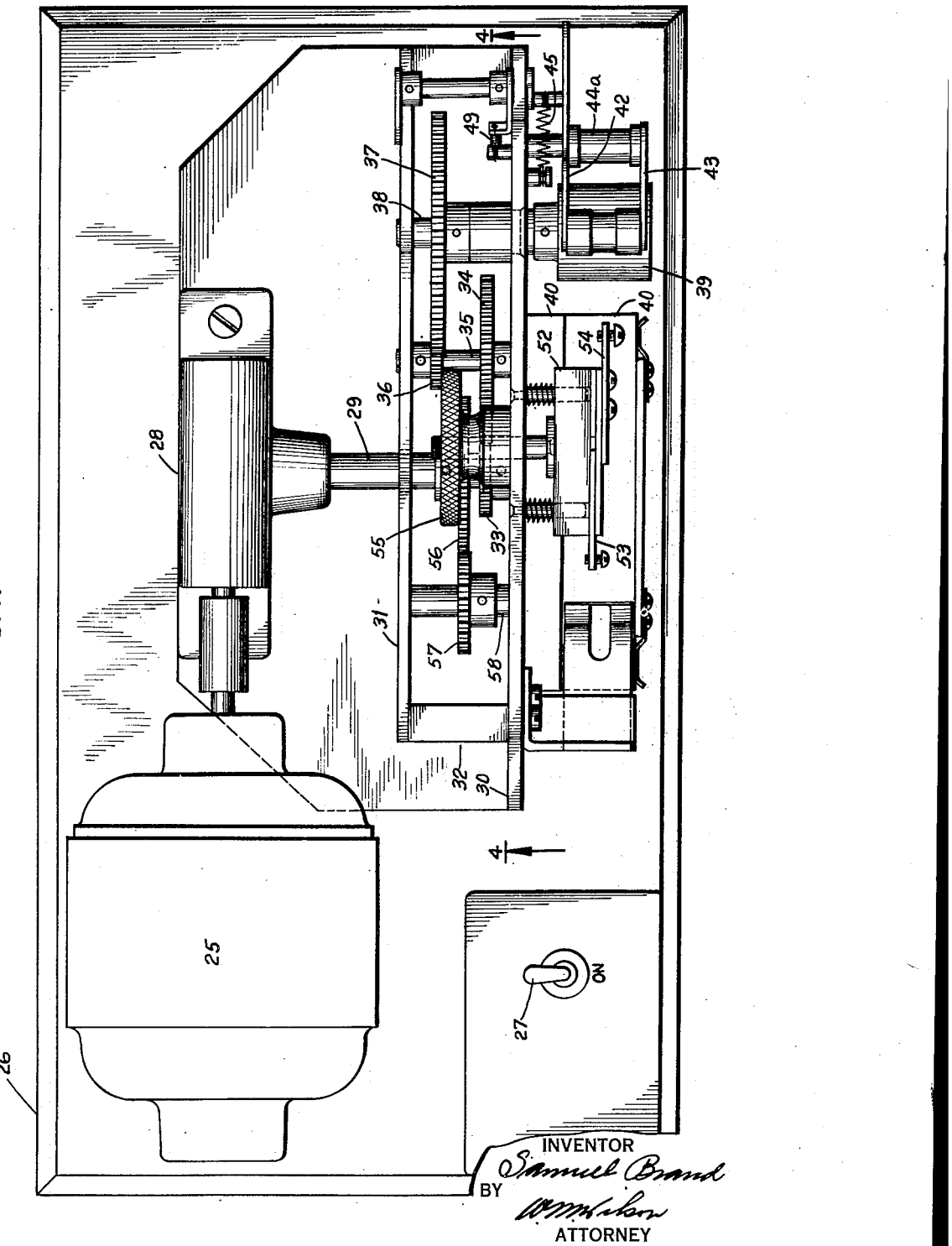
Fig. 1 is a plan view of the reading device.

In addition to gear 33, shaft 29 also carries a gear 56 between plates 30 and 31 (Figs. 1 and 4). Engaged with gear 56 is another gear 57 secured to shaft 58 which is thus rotated counterclockwise. Shaft 58 is journaled in plates 31 and 30 and extends through the latter and has a ratchet wheel 59 secured thereto in front of plate 30 (Fig. 5). A hollow shaft 60 is mounted on the end of shaft 58 and carries a disc 61 rigidly attached to its inner end adjacent the ratchet 59 (Fig. 3). A pawl 62 is pivoted at 63 on the disc and is biased toward ratchet 59 by spring 64 which extends between the pawl and pin 65 on the disc.

Directly above the disc and pawl is a lever 66 pivoted on plate 30 at 67 and biased counterclockwise against a stop 68. In this position a portion 69 of the left end of the lever 66 engages a tooth 70 on the disc 61 and a similarly shaped end 62' of the pawl 62 (Fig. 5). The pivot point 63 of the pawl is so located that the engagement of the end of the pawl by the end 69 of lever 66 will rotate the pawl in opposition to its spring bias and disengage the pawl from the ratchet just as the tooth 70 on disc 61 engages end portion 69. A latch 71 is pivoted at 74 on lever 66 and is biased counterclockwise by spring 73 to cause the disc tooth 70 to be latched between the end 69 and the latch 71. A pin 72 carried by latch 71 extends through a slot in lever 66 to act as a stop for the latch. The other end of lever 66 carries an armature 75 for cooperation with a magnet 76 mounted on a bracket 77. Then when the magnet 76 is energized the lever 66 will be rotated slightly clockwise releasing the pawl and disc. The pawl will be pulled into engagement with the ratchet thus interconnecting the shafts 58 and 60. As will be explained hereinafter, magnet 76 will be deenergized shortly after the interconnection of shafts 58 and 60 allowing lever 66 to return to its original position. As the disc nears completion of a revolution, tooth 70 will lift latch 71 and the end of the pawl will engage end portion 69 disconnecting shafts 58 and 60 just as tooth 70 is latched between end portion 69 and latch 71. The disc 61 also carries a pin 219a for engagement with a switch 219 to close same just before the completion of the revolution and to allow opening of the switch upon completion thereof.

Shaft 60 extends through a bushing 78 in a distributor support 79 which carries five conducting segments 80, 81, 82, 83, and 84 (Fig. 2). These segments are arranged in a circle concentric with shaft 60 and are separated by insulating portions of the support 79. Each segment carries a clip 85 for connection of a lead wire thereto. A brush 86 is carried by an insulating block 87 secured to shaft 60 so that the brush will be rotated therewith to successively engage the segments. The brush 86 is electrically connected with a contact fork 88 by means of screw 89, plate 90 and bearing 91, spring 92 serving to insure constant engagement of bearing 91 with fork 88 which is also adapted for connection to a lead wire as the other electrical side of the distributor from the segments. As is evident from the drawings, the brush 86 will be in contact with segment 80 when the clutch is disengaged and latched in position.

From the description thus far, it will be seen that the reading device includes means for feeding the record sheet past a pair of sensing brushes and a distributor arranged to be interconnected with the sheet driving mechanism by a single revolution clutch.

As mentioned heretofore, the reading device is designed to be electrically connected with a duplicating punch machine to effect punching of a record card in accordance with the value of the characters on the record sheet. A machine suitable for this purpose is shown in Figs. 11 to 15. This machine is old and well-known in the art and it is not believed necessary to give a complete, detailed description of the construction thereof since it is disclosed in detail in the U. S. Patent No. 1,976,618 issued to Lee and Daly on October 9, 1934. However, a general description of the operation of the punching machine will be given to enable an understanding of its use in the present invention.

Operation of the punching machine is initiated by manual movement of fingerpiece 93 (Fig. 11) to the left which causes a blank card 94 to be fed from hopper 95 by a picker 96 and which also acts through rack 102, gear 105, shaft 106, gear 107 and rack 108 to move carriages 97 and 101 to the right, carriage 97 receiving the blank card from the picker when the carriages are in their extreme right position (which is the left position in Fig. 14), the pawl 110 will engage teeth 109 of rack 108 to hold the carriage against an actuating spring with the card in position for punching in the first column by one of the punches indicated generally at 98 (Fig. 11). With each punching operation, shaft 111 (Fig. 14) will be rocked clockwise and then counterclockwise to first effect disengagement of pawl 110 from teeth 109 by shaft actuated pin 112, and the engagement of latch pawl 113 with teeth 109. Spring 114 will then pull pawl 110 to the left on its loose pivot to rest on top of the tooth so that when the counterclockwise movement of the shaft raises pawl 113, the advance of the rack 108 will be halted by pawl 110 engaging the next tooth.

Depression of one of the numeral keys 99 (Figs. 11, 12, 13) acts through a bell-crank 119 to move the corresponding interposer 120 to the left over the corresponding punch 121. The interposer rocks bail 122 about pivot 123 to raise lever 124 which lifts leaf spring 125 to close contacts 126. Closure of contacts 126 (Fig. 16) completes a circuit from positive line 191 through magnet 127, contacts 126, wires 193 and 194, closed contacts 172 and wire 195 to negative line 192. Magnet 127, thus energized, acts through its armature 128 (Fig. 13), link 129, bell-crank 130 and link 131 to rotate plate 132 and its pivot shaft 111. Plate 132 will then engage the displaced interposer to depress its punch 121 and perforate the card. As punching is accomplished, arm 133 on link 129 engages lever 124 to release leaf spring 125 and allow contacts 126 to open deenergizing magnet 127, the displaced parts then being repositioned by suitable springs.

Keys 99 may be depressed manually or by means of the duplicating mechanism which includes the usual contact roll 134 (Figs. 15 and 16) beneath which a perforated master card 100 is passed by carriage 101 for sensing by twelve brushes 135. The brushes are carried by insulating block 136 mounted on member 137 which is suspended from the frame by link 138 and connected through plate 139 and link 140 to armature 141 of magnet 142. When magnet 142 attracts armature 141, these parts cooperate with spring 143 in a toggle movement to raise the brushes into position engaging the card. Each brush 135 has a sliding electrical contact with a spring 144 which is electrically connected to one of the magnets 145. When one of brushes 135 extends through a perforation in the master card to contact roll 134, a circuit is completed from line 191 through wire 204, resistor 205, the corresponding magnet 145, brush 135, roll 134, brush 135a, wire 206, contacts 115, wires 207, 193 and 194, contacts 172 to line 192. It will be noted that magnets 145 are also numbered from 0 to 9 and 11 and 12 to indicate the numeral which is represented by the corresponding perforation. Each magnet 145 (Fig. 12) has an armature 146 secured to a lever 147 pivoted at one end and connected to the appropriate key 99, whereby energization of one of magnets 145 will effect operation of a punch. Contacts 115 (Fig. 14) will be broken momentarily by lever 116 actuated by pawl 110 upon punching to avoid arcing at the brushes.

In order to effect energization of magnet 142 to raise brushes 135, contacts 150, 151 and 155 must all be closed completing a circuit from line 191 through wire 202, contacts 150 and 151, magnet 142, resistor 203, contacts 155, wires 193 and 194 and contacts 172 to line 192. Contacts 150 (Fig. 15) are normally open and are closed only when the duplicating mechanism is to be used and master card door 149 is closed and latched by member 148. Contacts 151 (Fig. 12) are normally closed and are opened by pin 152 on plate 153, which is frictionally connected with shaft 154 rotated by pinion 103, only while the carriages are being moved to the right. Contacts 155 (Fig. 16) are normally closed but may be opened by the action of cams 158 of escapement bar 157 (Fig. 11) upon member 159 carried by lever 156 which is movable with the carriages. Contacts 155 will always be opened just after the last card column is punched.

At the extreme left of the punching machine (Fig. 11) is the usual card ejector mechanism including a pair of jaws 160 and 161 held in the position shown by a latch. Just after punching of the last column, contacts 117 (Fig. 14) are closed by pin 118 to complete a circuit from line 191 through wires 196, 197, resistor 198, magnet 162 and contacts 117 to line 192. Energization of magnet 162 releases the latch and allows a spring to move rack 165 to the right (Fig. 11) to act through gears in casing 164 upon jaws 160 and 161 to effect movement thereof to remove the punched card from the carriage. Return of rack 165 and the jaws is effected upon return of the carriage to the right.

As rack 165 moves to the right during card ejection, it will engage block 166 to close contacts 167 and complete a circuit from line 191 through safety contacts 163, wire 199, magnet 168, resistor 200, contacts 167 and 117 to line 192. Magnet 168 will attract its armature 169 (Figs. 12 and 13) to cause two things to happen. First, arm 170 will engage block 171 to open contacts 172 and close contacts 173, the block being then held by latch 174. Opening of contacts 172 will prevent any punching from occurring and closure of contacts 173 will complete a circuit from line 191 through contacts 163, motor 175, resistor 201, contacts 173 and wire 195 to line 192. The motor will then act through worm 176 and gear 177 to rotate shaft 178. The second action of armature 169 is to lower lever 179 (Fig. 13) against pin 180 carried by pawl 181 pivoted on disk 182. The toggle mechanism consisting of rod 183 pivoted at 184, lever 185 pivoted at 186, and spring 187; will be moved downwardly by movement of pin 180 effecting engagement of pawl 181 with ratchet 188 which is secured to shaft 178. Since disk 182 is connected with gear 104, the clutch arrangement actuated by magnet 168 will cause gear 104 to be rotated by motor 175 to drive rack 102 and effect return of the carriages to the right. One revolution of gear 104 is sufficient and at the completion thereof, the free end of pawl 181 will strike projection 189 of stationary member 190 shifting the toggle mechanism and disengaging the pawl and ratchet. Gear 104 also carries a member (not shown) for releasing latch 174 resulting in opening of contacts 173 and closure of contacts 172. Safety contacts 163 (Figs. 15 and 16) are opened during energization of brush magnet 142 to prevent restoration of the carriages until the brushes 135 are lowered.

In order to understand the operation of the punching machine by the reading device, it will be necessary first to carefully examine Fig. 6. As pointed out hereinbefore, characters 21 are electrically conductive and are to be scanned progressively from top to bottom by the horizontally spaced sensing brushes 22 and 23. It will be seen that both the vertical and diagonal bars of the characters are considerably narrower horizontally than the space between the brushes so that the brushes cannot be electrically interconnected by simultaneous engagement with a single vertical bar or a single diagonal bar. Further, those diagonal bars which form an acute angle with a vertical bar are disconnected therefrom (see numerals 1 and 4), to avoid interconnection of the brushes by simultaneous engagement with connected diagonal and vertical bars. It now becomes obvious that these characters are so formed and their configuration is such that only the horizontal bars will interconnect the sensing brushes. Since the horizontal bars, or index marks, are considerably wider than the space between the sensing brushes, it becomes apparent that the characters may be irregularly disposed crosswise of the line of scanning, as may occur in a typewritten record, and still effect interconnection of the sensing brushes by each horizontal bar. It is to be understood that the spacing of the brushes 22 and 23 may be even less than shown as long as they will not be interconnected except by the horizontal bars.

For purposes of illustration and explanation only, the characters in Fig. 6 have been divided by horizontal lines spaced along the line of motion of the record sheet. It will be recalled that the rotation of the distributor brush and the movement of the sheet have a timed relation since both are driven by the same motor. The space between the horizontal lines is the distance that the sheet will be moved past the sensing brushes along a single straight line in the time that it takes the distributor brush to move from one distributor segment to the next. However, it is to be understood that the distributor brush is not necessarily moved from one segment to the next when the sheet is moved the distance between one horizontal line and the next. It will be explained in connection with the wiring diagram how the first interconnection of the sensing brushes 23 and 22 by a horizontal bar of each character will effect operation of the one revolution clutch resulting in a single revolution of the distributor brush, the size and spacing of the characters allowing a complete revolution before scanning of the next character. In other words, the first horizontal bar of each character will always be encountered by the sensing brushes while the distributor brush 86 is on segment 80, whereupon the distributor brush will be rotated and after all segments have been contacted thereby, it will be held stationary on segment 80 until the first horizontal bar of the next character is encountered. Examination of the character "0" with regard to the spaced horizontal lines reveals that the sensing brushes will be interconnected while the distributor brush engages segments 80 and 83. Fig. 8 is a chart giving the segments contacted during brush interconnections for each different character. It will be noted that the combination of segments for each character is different from the rest and the combinations set forth in the chart constitute a code.

Referring now to Fig. 16, upon closure of the hand switch 27, a circuit is completed from line 191 through wire 208, variable resistor 209, motor 25, switch 27, wires 193, and wire 194, contacts 172, wire 195 to line 192. Thus the motor 25 will run at all times except when a punched card is being ejected and the carriages are being restored. The motor 25 feeds the record sheet past sensing brushes 22 and 23 along a single straight line and when the latter are interconnected by a portion of a character a shunt circuit for the battery 210 is established from the plus side of the battery through brush 23 to brush 22, resistor 211 to the minus side of the battery. The battery is for biasing the grid of an amplifying vacuum tube 212 of a well known type whose cathode heater is connected between line 191 and 192 through resistor 213 and switch 214.

When the grid bias of the tube 212 is changed by shunting of the battery by interconnection of the sensing brushes, the tube passes current. The cathode of the tube is connected to line 192 and the plate is connected to brush 86 of the distributor. Each of the distributor segments 80, 81, 82, 83 and 84 are connected to line 191 through relays 80a, 81a, 82a, 83a and 84a, respectively, and wire 215. As previously pointed out, brush 86 will be in contact with segment 80 when the first sensing brush interconnection is made during the scanning of each character. Energization of relay 80a will result and effect closing of contacts 80b. A circuit is then completed from line 191 through magnet 76, contacts 80b, wires 216 and 217, contacts 115, wires 207, 193, and 194, contacts 172, wire 195 to line 192. When magnet 76 is thus energized, the one revolution clutch is operated to start rotation of distributor brush 86. Thereafter, certain of relays 81a, 82a, 83a and 84a will be energized in accordance with the code in Fig. 8. As each one of these latter relays is energized, it closes the corresponding one of contacts 81b, 82b, 83b, and 84b to complete a holding circuit from line 191 through wire 215, the relay and corresponding contacts, wires 216 and 217, contacts 115, wires 207, 193 and 194, contacts 172, wire 195 to line 192. In addition, as each one of relays 81a, 82a, 83a, 84a is energized, it will close the corresponding one of contacts 81c, 82c, 83c and 84c to complete a circuit from line 191 through wire 218, the corresponding one of code storage relays 81d, 82d, 83d and 84d and of contacts 81c, 82c, 83c and 84c and of contacts 81b, 82b, 83b, and 84b, wires 216 and 217, contacts 115 and 172 to line 192.

Relay 81d is arranged to operate three double throw switches comprising contacts 81e and 81f, 81g and 81h, 81j and 81k, with contacts 81f, 81h and 81k being normally closed. Relay 82d is arranged to operate two double throw switches comprising contacts 82e and 82f, 82g and 82h, with contacts 82f and 82h normally closed. Relay 83d also operates three double throw switches comprising contacts 83e and 83f, 83g and 83h, 83j and 83k with 83f, 83h and 83k normally closed. Relay 84d operates a double throw switch comprising contacts 84e and 84f with 84f being normally closed. Thus, as the distributor brush is rotated during scanning of a character, various ones of relays 81d, 82d, 83d and 84d are energized to set up various switch combinations. The switches just described are wired to each other as shown in Fig. 16 and some are connected to magnets 145 which operate the punches.

Just before the distributor brush is latched up and after each segment has been contacted, switch 219 is momentarily closed by pin 219a on disk 61 (see Fig. 5) to complete a circuit from line 191 through wire 221, relay 220, contacts 219, wire 217, contacts 115 and 172 to line 192. Relay 220 closes switch 222 shunting contacts 219 to form a holding circuit. It is then apparent that magnets 145 are connected to line 191 and switch 222 is connected to line 192 and a circuit will be completed when these two are connected.

From the chart (Fig. 8) it is seen that if a "0" is scanned, relays 80a and 83d will be energized, the first starting the distributor brush and the latter operating its related switch. Then switch 222 is connected through contacts 84f, 82h, 81k, and 83j to the "0" punching magnet. If a "1" is scanned, relays 80a and 84d are energized connecting switch 222 through contacts 84e, 82f and 81f to the "1" punching magnet 145. If a "2" is scanned, relays 80a, 82d and 83d are energized connecting switch 222 through contacts 84f, 82g, 81h and 83e to the "2" magnet 145. Similarly, a "3" will effect a circuit through 84e, 82f, and 81e; a "4" through 84f, 82h, 81k and 83k; a "5" through 84f, 82g and 81g; a "6" through 84e and 82e; a "7" through 84f, 82h, 81j and 83h; an "8" through 84f, 82h, 81j and 83g; and a "9" through 84f, 82g, 81h and 83f.

Thus, the reading device may be used to transfer printed data to a record card of the perforated type; for when a character is scanned by the reading device, it energizes one of the magnets 145 to effect appropriate punching of the card. After each punching operation, the contacts 115 are opened (Fig. 14) breaking the circuit to switch 222 and also to relays 81a, 82a, 83a and 84a and restoring all the relay switches to their normal position to permit reading of the next character. The spacing of the characters is such that considerable variation in the vertical disposal of the characters on the sheet may exist and still allow sufficient time to effect punching before reading of the next character. When the last perforation in a column of the card has been punched, ejection of the card, restoration of the carriage and feeding of a new card will be accomplished as previously described.

In Fig. 7 is shown a series of characters each comprised of one or more horizontal bars positioned in a column. These characters represent the numerals shown adjacent thereto in Fig. 6 and have the horizontal bars in the same positions. Obviously, the characters in Fig. 7 are not as easily read as those in Fig. 6 but they will produce the same perforations in a card when scanned and may be read by a person well acquainted with the code. The advantage of such characters as these is that a sensing unit similar to the one in Fig. 9 may be used. This type of sensing unit 223 is comprised of four closely spaced brushes 224, 225, 226 and 227, with brushes 224 and 226 and brushes 225 and 227 interconnected by wires. Such a unit when passed over one of the bars would allow any one of three interconnections by the bar to effect operation of the reading device, namely, 224 to 225, 225 to 226, and 226 to 227. Thus the possibilities of a break in the conductivity of a bar causing an error is eliminated and an even greater variation in the horizontal disposal of a character on the sheet is permissible. In addition, the interconnection of brushes 224 and 227 will effect operation of the device and is useful in case the center brushes should be accidentally raised from the paper.

In Fig. 10 is shown a variation in characters which makes use of a different code and consequently a different wiring of the relays although the same principles are employed as previously described. As shown diagrammatically, the sensing unit includes two wide electrodes 250 passing over the outer edges of the characters and a single double-strand brush 251 passing through the center of the characters. Electrodes 250 are permanently interconnected and are arranged to always contact a portion of the character being scanned by brush 251. Thus, when brush 251 contacts a portion of a character, current will flow between the brush and one of the electrodes by way of the conducting ink. It will be noted that the brush 251 will contact the vertical stem of the characters "1" and "4" which stems are rather thick to allow variation in the disposal of the characters.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a reading device for a record sheet having code characters thereon, sensing means, each of said code characters having one or more index marks of conductive material positioned along a single straight line in conformity with a code, means for causing a relative unidirectional uniform movement between said sheet and sensing means to effect cooperation of the latter with successive index marks of a code character, work agencies, and means for effecting selective operation of said agencies according to the relative times at which said sensing means cooperates with the conductive marks of a character.

2. In a reading device for a record sheet having legible characters thereon, means for effecting uniformly progressive scanning along a single straight line through each character, each of said characters having portions forming electrically conductive index marks positioned along said line for successively influencing said scanning means at certain times in conformity with a code, work agencies, and means for effecting selective operation of said agencies according to the relative times at which said scanning means is influenced by the conductive marks of a character.

3. In a device of the type described for use with a record sheet having legible characters arranged thereon in a column, sensing means, sheet feeding means to effect scanning by the sensing means along a single straight line extending through each character in the column, each of said characters having conductive portions forming index marks positioned along said line for successively influencing said sensing means at one or more times during the scanning of each character in conformity with a code, character entry means, control means therefor, means for effecting selective setting of said control means according to the relative times at which the sensing means is influenced by the marks of a character, and means operable after the scanning of each character for effecting operation of said character entry means under the control of said control means.

4. In a reading device for use with a record sheet having characters thereon of electricity conducting substance, spaced sensing brushes, means for effecting sensing by the brushes along a straight line through each character, said characters being so formed that electrical interconnection of the brushes by portions of a character will occur only at certain times during the sensing of that character in conformity with a code, a plurality of work circuits, and means for selectively energizing said circuits according to the time and number of brush interconnections by each character.

5. In a reading device for a record sheet having characters thereon, means to effect scanning of each character progressively, each of said characters having one or more index marks positioned in conformity with a code for successively influencing said scanning means, work agencies, means for effecting selective operation of said agencies in accordance with the relative times at which said scanning means is influenced by the index marks of a character, means effective upon the cooperation of the scanning means with the first index mark of each character to initiate operation of said selective means, and means for halting the operation of said selective means after the scanning of each character.

6. In a reading device for a record sheet having characters thereon, scanning means, means to effect scanning of each character progressively, each of said characters having one or more index marks positioned in conformity with a code for successively influencing said scanning means, code storage devices, means responsive to the scanning means and including means operating in timed relation to the rate of scanning for effecting selective setting of said devices according to the relative times at which said scanning means is influenced by the index marks of a character, means effective upon the influencing of the scanning means by the first index mark of each character to initiate operation of said setting means, and means for halting the operation of said setting means after the scanning of each character.

7. In a reading device for a record sheet having characters thereon, means to effect scanning of each character progressively, each of said characters having one or more index marks positioned in accordance with a predetermined code for successively influencing said scanning means, a plurality of work circuits, means including an intermittently operated distributor for selectively energizing said circuits according to the relative times at which the scanning means is influenced by the index marks of each character, means for halting operation of said distributor after the scanning of each character, and means responsive to the influence on the scanning means of the first index mark of each character for initiating operation of said distributor.

8. In a reading device for a record sheet having characters thereon, scanning means, driving means for causing relative movement between the scanning means and sheet to effect scanning of each character progressively, each of said characters having index marks to influence said scanning means at certain timed intervals during the scanning of that character in accordance with a code, a plurality of work circuits, means including a distributor for selectively energizing said circuits according to the times at which the scanning means is influenced by the index marks of each character, means responsive to the cooperation of the first index mark of each character with the scanning means for connecting said distributor to said driving means for operation in timed relation to the rate of scanning, and means for disconnecting said distributor and driving means after the scanning of each character.

9. In a reading device for a record sheet having characters thereon, scanning means, driving means for causing relative movement between said sheet and scanning means to effect scanning of each character progressively, each character having one or more index marks positioned in conformity with a code for successively influencing said scanning means, work agencies, means including a distributor for effecting selective operation of said agencies according to the times at which the scanning means is influenced by the index marks of each character, a onecycle clutch for connecting said distributor to said driving means, and means operable to effect engagement of said clutch upon the influencing of the scanning means by the first index mark of a character.

10. In a reading device for a record sheet having characters thereon, scanning means, driving means for causing relative movement between said sheet and scanning means to effect scanning of each character progressively, each character having one or more index marks positioned in conformity with a code for successively influencing said scanning means, a source of electrical energy, a plurality of work circuits, a distributor for successively connecting said work circuits to said source through a normally open circuit, means operable during cooperation of each index mark with the scanning means to close said open circuit, a one revolution clutch for connecting said distributor to said driving means, and electrical means for effecting operation of said clutch, said distributor being arranged to make one revolution for each character scanned and serving to connect said electrical means to said source through said open circuit when at rest, whereby cooperation of the first index mark of each character with said scanning means will effect operation of said clutch.

11. In a reading device for a record sheet having characters thereon, means for effecting progressive scanning of a relatively narrow vertical strip through each character, each of said characters including one or more bars positioned in a column for influencing the scanning means at certain times in conformity with a code with the bars at substantially right angles to the strip and normally extending on each side thereof, work controlling devices, means for effecting selective operation of said devices in accordance with the relative times at which said scanning means is influenced by the bars of a character, means effective upon influencing of the scanning means by the first bar of each character to initiate operation of said selective means, and means for automatically halting said selective means after the scanning of each character, whereby said selective means will be properly operated even though there is irregularity in the vertical or horizontal disposition of a character relative to said strip.

12. In a reading device for a record sheet having legible characters thereon, means for effecting progressive scanning of a relatively narrow vertical strip through each character, each of said characters being legible and having one or more portions forming index marks positioned along said strip for influencing the scanning means at certain times in conformity with a code, said portions normally extending on each side of said strip, work controlling devices, means for effecting selective operation of said devices in accordance with the relative times at which said scanning means is influenced by the index marks of a character, means effective upon the influencing of the scanning means by the first mark of each character to initiate operation of said selective means, and means for automatically halting said selective means after the scanning of each character, whereby correct reading will be effected even though a character may be irregularly disposed vertically and/or horizontally of said strip.

13. In a reading device for a record sheet having characters thereon of electricity conductive substance, sheet moving means, a pair of spaced sensing brushes, said characters being so formed in conformity with a code and with respect to the brush spacing that electrical interconnection of the brushes by portions of a character will occur only at certain times during sensing of that character even though there is irregularity in the crosswise disposition thereof, work controlling devices, means for effecting selective operation of said devices according to the relative time of brush interconnections, means effective upon the first brush interconnection by each character to initiate operation of said selective means, and means for automatically halting said selective means after the sensing of each character.

14. In a punching mechanism, a series of electromagnets for effecting selective punching of a card in various locations according to a record sheet having characters thereon, scanning means, means for causing relative movement between the scanning means and the sheet continuously and uniformly in a single direction only to effect scanning of each character progressively, each of said characters being formed in aligned portions along a single straight line to influence said scanning means at certain timed intervals in accordance with a code, and means operable in timed relation to the rate of scanning and responsive to said scanning means for effecting selective energization of said electromagnets.

15. In a mechanism for perforating a card according to the values of characters carried by a record sheet, means for progressively scanning each of said characters including spaced sensing brushes, said characters being formed of electricity conductive substance with each character having such a configuration that interconnection of the brushes by portions of a character will occur only at certain times during the scanning of that character in conformity with a code, a plurality of work circuits, means responsive to brush interconnections and including means operating in timed relation to the rate of scanning for selectively energizing said work circuits, a series of electromagnets, a punch associated with each magnet to be operated thereby, and means including a plurality of switches operable by said work circuits for effecting selective energization of said electromagnets.

16. In a mechanism for effecting punching of a card in various desired positions according to the values of characters carried by a record sheet, a series of punch operating electromagnets, means for effecting scanning of each character progressively, said scanning means including means for effecting the scanning along a single straight line, each of said characters having one or more index marks aligned along a single straight line and positioned in conformity with a character value code for influencing said scanning means at certain times, means responsive to said scanning means during the scanning of each character for effecting selective connection of one of said electromagnets to a normally open circuit, and means operable by said selective means after the scanning of each character for momentarily closing said circuit to energize said one electromagnet.

17. In a mechanism for perforating a record card in accordance with the values of characters carried by a record sheet, means for effecting scanning of each character progressively, said scanning means including means for effecting the scanning in a single straight line, each of said characters having one or more index marks aligned along a single straight line and positioned in conformity with a code for influencing said scanning means at certain times, a source of electrical energy, a plurality of work circuits, means responsive to said scanning means for selectively connecting said circuits to said source, a plurality of punches, a plurality of electromagnets, each of said electromagnets being arranged to effect operation of a different punch, a plurality of switches operable by said work circuits to selectively connect one of said electromagnets through an open circuit to said source, and means operable momentarily upon completion of the scanning of each character for closing said open circuit to effect punching.

18. In a mechanism for perforating a card according to the values of characters carried by a record sheet, a set of punches, a plurality of electromagnets, each electromagnet being effective to operate a different punch, means for effecting scanning of each character progressively, said scanning means including means for effecting the scanning in a single straight line, each of said characters being formed in aligned portions along a single straight line to influence said scanning means at certain times during scanning of that character in conformity with a code, a plurality of work circuits, a plurality of switches operable by said work circuits for selectively connecting one of said electromagnets to a normally open circuit, means operating in timed relation to the rate of scanning and responsive to said scanning means for selectively energizing said work circuits, means operable after the scanning of each character for momentarily closing said open circuit to energize the selected electromagnet, and means operable upon punching to effect deenergization of said work circuits.

19. In a mechanism for perforating a card according to the values of characters carried by a record sheet, a set of electromagnets, a punch associated with each electromagnet to be operated thereby, means to effect scanning of each character progressively, each of said characters having one or more index marks positioned in conformity with a code for successively influencing said scanning means at certain times, selecting means including means operating in timed relation to the rate of scanning for selecting one of said electromagnets in accordance with the relative times at which said scanning means is influenced by the index marks of a character, means effective upon the influencing of the scanning means by the first index mark of each character to initiate operation of said selecting means, means for energizing said selected magnet after the scanning of each character, and means for automatically halting said selecting means prior to the scanning of the next character.

20. In a mechanism for perforating a card according to the values of characters carried by a record sheet, a set of electromagnets, a punch associated with each electromagnet to be operated thereby, means for effecting progressive scanning of each character, each of said characters having one or more index marks positioned in accordance with a code for successively influencing said scanning means at certain times, a source of electrical energy, a plurality of work circuits, means including an intermittently operating distributor for selectively connecting said circuits to said source according to the times at which the scanning means is influenced by the index marks of each character, means effective upon the influencing of the scanning means by the first index mark of each character for initiating operation of said distributor, means for halting said distributor after the scanning of each character, a plurality of switches operable by said work circuits to selectively connect one of said electromagnets through an open circuit to said source, and means associated with said distributor to close said open circuit after the scanning of each character.

21. In a mechanism for perforating a card according to the values of characters carried by a record sheet, a set of electromagnets, a punch associated with each magnet to be operated thereby, means to effect progressive scanning of each character, each of said characters having one or more index marks positioned in conformity with a code for successively influencing said scanning means, storage means, means operating in timed relation to the rate of scanning for setting said storage means according to the times at which the scanning means is influenced by each character, said storage means acting to select a magnet in accordance with its setting, means effective upon the influencing of the scanning means by the first index mark of each character to initiate operation of said setting means, means operable by said setting means after scanning of each character to energize the selected magnet, means for automatically halting said setting means prior to the scanning of the next character, and means operable upon punching to release said storage means.

22. In a reading device for a record sheet having a column of characters thereon, sensing means, each of said characters having one or more index notations positioned along said column in a single line only, in conformity with a code, means producing relative movement between said sheet and said sensing means in the direction of said column whereby said sensing means and index notations physically contact upon crossing, a circuit including said sensing means and an energy source and controlled by the variation in an electrical characteristic thereof upon each physical contact of said index notations and sensing means, energy actuated elements, and means producing selective energization of said elements in accordance with the number of index notations and the relative times of contact of said index notations and sensing means.

23. In a reading device for use with a record sheet, a column of characters on said sheet, means positioned in conformance with a code along the columnar extension of each of said characters in a single line only, for varying an electrical constant of a circuit, sensing means, an electrical circuit including an energy source connected to said sensing means, means producing relative movement in the direction of said column only, between said sensing means and said characters whereby said circuit is closed at differential times by physical engagement of said sensing means and positioned means to produce variations in an electrical constant of said circuit in conformance with said code, a plurality of energy controlled circuits, and means for selectively energizing said circuits in conformance with said variations.

24. In a reading device for use with a record sheet, a column of characters on said sheet, means positioned in conformance with a code along the columnar extension of each of said characters in a single line only, for varying the electrical resistance of a circuit, sensing means, an electrical circuit including an energy source connected to said sensing means, means producing relative movement in the direction of said column only, between said sensing means and said characters whereby said circuit is closed at differential times by physical engagement of said sensing means and positioned means to produce variations in the electrical resistance of said circuit in conformance with said code, a plurality of energy controlled circuits, and means for selectively energizing said circuits in conformance with said resistance variations.

25. In a reading device for a record sheet bearing legible characters, each character having portions forming index marks to identify said character according to a combinational code, all index marks in each character combination being aligned along a single straight line, sensing means for progressively sensing said index marks, said sensing means including means for effecting sensing in a single straight line and said sensing means consisting of means affected in one manner or in a reverse manner in conformity with the code representing the character being sensed, storage means and means for selectively conditioning said storage means in accordance with the code representing said character.

26. In a reading device for a record sheet, a column of characters on said sheet, means for effecting progressive sensing of a relatively narrow strip through each of said characters in a columnar direction, each of said characters including one or more bars located at substantially right angles to said column and normally extending on each side of said strip and positioned in accordance with a code combination along said character in said columnar direction for successively affecting said sensing means at certain times during the sensing of that character in conformity with the code value of said character, said bars producing sequential sensing of inadvertently staggered characters, a plurality of work circuits, and means for selectively operating said circuits in conformance with the code combination of said certain times said sensing means are affected.

27. In a reading device for a record sheet, a column of characters on said sheet, means for effecting progressive sensing of said characters in a columnar direction, each of said characters being legible and electrically conductive, and so formed that only the portions thereof extending transversely of said column will short said sensing means, said portions being positioned in said columnar direction along said character in accordance with a code combination for successively shorting said sensing means at certain times during the sensing of said character in conformity with the code value of said character, said portions producing proper sequential shorting of said sensing means during sensing of inadvertently staggered characters, a plurality of work circuits, and means for selectively operating said circuits in conformance with the code combinations of said certain times said sensing means are shorted.

28. In a reading device for a record sheet, a column of characters on said sheet, means for effecting progressive sensing of a relatively narrow strip through each of said characters in a columnar direction, each of said characters being so formed that only the portions thereof extending transversely of said column will affect said sensing means, said portions being positioned in said columnar direction along said character in accordance with a code combination for successively affecting said sensing means at certain times during sensing of said character in conformity with the code value of said character, said portions extending beyond said narrow strip and producing proper sequential sensing of inadvertently staggered characters, a plurality of work circuits, and means for selectively operating said circuit in conformance with the code combinations of said certain times said sensing means are affected.

29. In a reading device for a record sheet, a column of characters on said sheet, means for effecting progressive sensing of said characters in a columnar direction including a pair of brushes disposed transversely of said column, brushes intermediate said pair of brushes, means electrically interconnecting one of said intermediate brushes and one of said pair, means electrically interconnecting another of said intermediate brushes and the other of said pair, said characters comprising portions extending transversely of said column and distributed in said columnar direction in accordance with a code combination, and a plurality of circuits selectively actuated in accordance with the times of intersection of said sensing means and said distributed portions.

30. In a reading device for a record sheet, a column of characters on said sheet, means for effecting progressive sensing of said characters in a columnar direction including a pair of electrodes disposed transversely of said column, each of said electrodes comprising an elongated element extending in said columnar direction, and brush means intermediate said pair of electrodes, said characters comprising portions extending transversely of said column and distributed in said columnar direction in accordance with a code combination, and a plurality of circuits selectively actuated in accordance with the times of simultaneous intersection of one of said electrodes and said brush means with said distributed portions.

SAMUEL BRAND.